(12) United States Patent (10) Patent No.: US 9,348,174 B2
Dunn et al. (45) Date of Patent: May 24, 2016

(54) RIGID LCD ASSEMBLY

(71) Applicant: Manufacturing Resources International, Inc., Alpharetta, GA (US)

(72) Inventors: William Dunn, Alpharetta, GA (US); Michael LeCave, Gainesville, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 78 days.

(21) Appl. No.: 14/192,130

(22) Filed: Feb. 27, 2014

(65) Prior Publication Data

US 2014/0268657 A1    Sep. 18, 2014

Related U.S. Application Data

(60) Provisional application No. 61/785,285, filed on Mar. 14, 2013.

(51) Int. Cl.
  *G02F 1/1335*    (2006.01)
  *G02F 1/1333*    (2006.01)

(52) U.S. Cl.
  CPC .... *G02F 1/133606* (2013.01); *G02F 1/133308* (2013.01); *G02F 2001/133311* (2013.01); *G02F 2202/28* (2013.01)

(58) Field of Classification Search
  CPC .......... G02F 1/133606; G02F 1/133308; G02F 1/133608; G02F 2202/28; G02F 2001/133311; G02B 6/0025; G02B 6/0051
  See application file for complete search history.

(56) References Cited

U.S. PATENT DOCUMENTS

| | | | |
|---|---|---|---|
| 6,027,222 A * | 2/2000 | Oki | G02B 6/0038 362/330 |
| 7,232,250 B2 | 6/2007 | Chuang | |
| 2003/0026085 A1* | 2/2003 | Ueda et al. | 362/31 |
| 2005/0094391 A1 | 5/2005 | Campbell | |
| 2006/0082700 A1 | 4/2006 | Gehlsen | |
| 2007/0139574 A1 | 6/2007 | Ko | |
| 2007/0230218 A1 | 10/2007 | Jachim | |
| 2011/0013114 A1 | 1/2011 | Dunn | |
| 2011/0116000 A1 | 5/2011 | Dunn | |
| 2012/0050958 A1 | 3/2012 | Sanford | |

(Continued)

FOREIGN PATENT DOCUMENTS

WO   WO2010-080624     7/2010

OTHER PUBLICATIONS

Dave Roos "How Transmissive Film Works" Jul. 10, 2008. HowStuffWorks.com. <http://computerhowstuffworks.com/transmissive-film.htm> downloaded Mar. 8, 2016.

*Primary Examiner* — Bao Q Truong
(74) *Attorney, Agent, or Firm* — Standley Law Group LLP

(57) ABSTRACT

Exemplary embodiments disclosed herein provide a rigid LCD assembly including a LCD having a perimeter, a first layer of tape around the perimeter of the LCD, and a diffusing plate attached to the later of tape so as to create a cavity defined by the space between the LCD, tape, and diffusing plate. One or more optical films may be inserted into the cavity, and while constricted in directions perpendicular to the films, the films may be free to move slightly in the directions parallel to the films. A U-shaped backlight wall may attach to the diffusing plate and would contain a backlight. An optional thermal plate can be attached to the backlight wall, which can be used with a second thermal plate to define a channel for accepting cooling air.

20 Claims, 7 Drawing Sheets

(56) References Cited

U.S. PATENT DOCUMENTS

| | | |
|---|---|---|
| 2012/0154712 A1 | 6/2012 | Yu |
| 2012/0242926 A1 | 9/2012 | Hsu |
| 2013/0027633 A1 | 1/2013 | Park |
| 2013/0094160 A1* | 4/2013 | Narumi .......................... 361/752 |
| 2013/0163277 A1* | 6/2013 | Kim et al. ..................... 362/602 |

* cited by examiner

RIGID LCD ASSEMBLY

CROSS-REFERENCE TO RELATED APPLICATIONS

This application claims priority to U.S. Provisional Application No. 61/785,285, filed on Mar. 14, 2013, which is herein incorporated by reference in its entirety.

TECHNICAL FIELD

Embodiments generally relate to liquid crystal display assemblies.

BACKGROUND OF THE ART

Liquid crystal displays (LCDs) are now being used in many environments which are not protected from direct sunlight, shock, or high/low ambient temperatures. Specifically, it is now desirable to place LCDs on a moving vehicle, typically for advertising or informational purposes. While they can be placed anywhere on the vehicle, it is sometimes preferred to place the LCDs atop the vehicle, attached to the roof. Of course, traditional LCDs are not capable of withstanding the impacts of sunlight, weather, high/low ambient temperatures, as well as the shock that would be transferred to the LCD when the vehicle hits potholes, curbs, speed bumps, and sometimes other vehicles.

The various layers used to construct an LCD are typically very thin, as the thinner LCD assemblies have been more popular in the marketplace and are typically more appealing to the consumer. However, thin components have been difficult to form into a resulting assembly that is durable enough to withstand this particular application and all of the competing environmental factors, while still producing a very bright, high quality image that does not degrade over time.

SUMMARY OF THE EXEMPLARY EMBODIMENTS

Exemplary embodiments disclosed herein provide a rigid LCD assembly including a LCD having a perimeter, a first layer of tape around the perimeter of the LCD, and a diffusing plate attached to the later of tape so as to create a cavity defined by the space between the LCD, tape, and diffusing plate. One or more optical films may be inserted into the cavity, and while constricted in directions perpendicular to the films, the films may be free to move slightly in the directions parallel to the films. A U-shaped backlight wall may attach to the diffusing plate and would contain a backlight. An optional thermal plate can be attached to the backlight wall, which can be used with a second thermal plate to define a channel for accepting cooling air.

The foregoing and other features and advantages of the exemplary embodiments of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
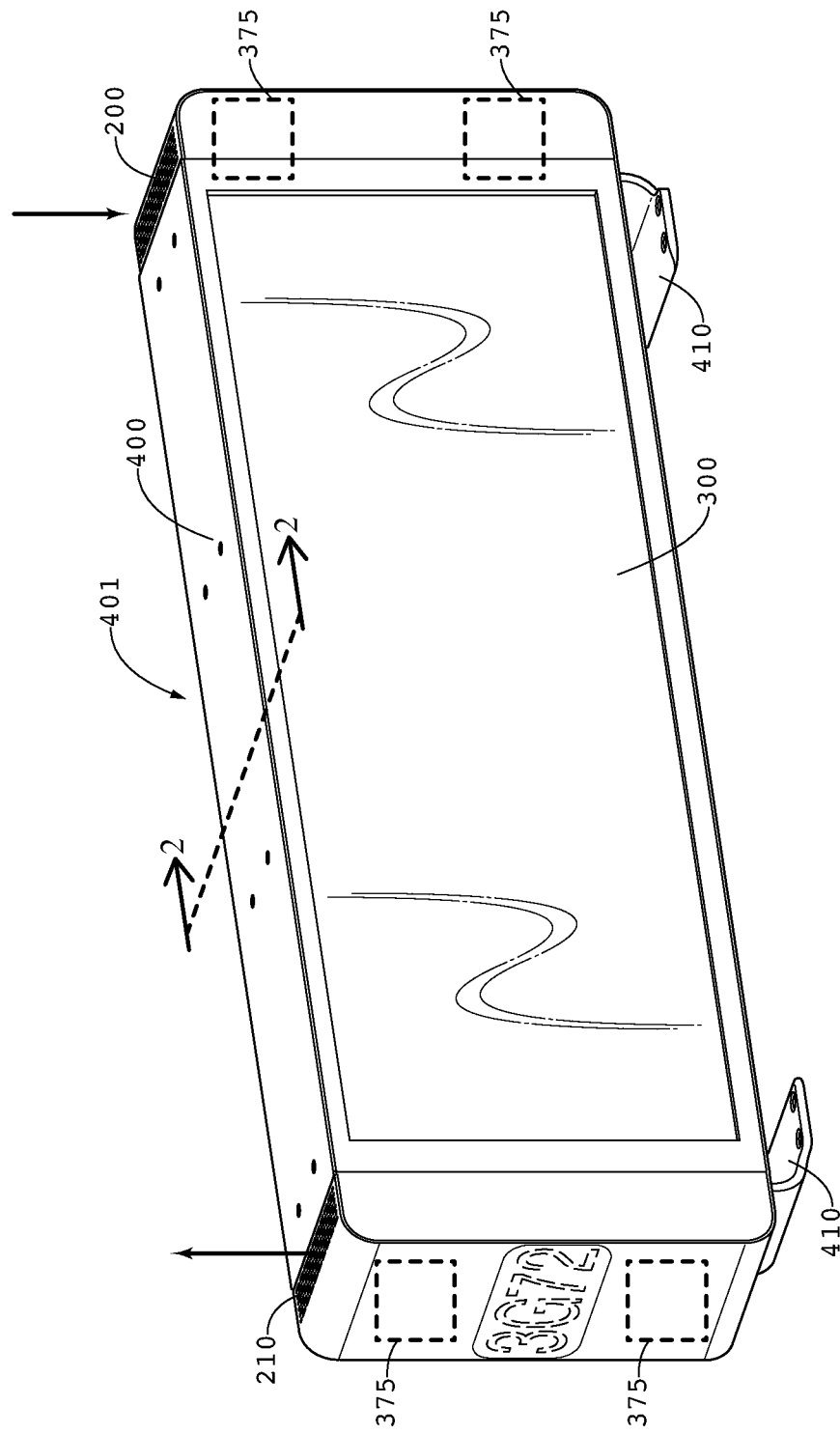
FIG. 1 is a perspective view of a car top assembly for back to back LCDs and showing the section line 2-2.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a car top assembly 401 for back to back LCDs and showing the section line 2-2. A housing 400 contains and protects the components and has mounting plates 410 as well as an external air inlet 200 and external air outlet 210. The housing 400 is preferably metal but this is not required. A transparent protective plate 300 is used to protect the internal LCD. In an exemplary embodiment the plate 300 would be glass and would contain at least one anti-reflective layer or coating. In some embodiments the plate 300 may be a single pane of tempered glass while in other embodiments the plate 300 may be two pieces of anti-reflective glass laminated together with optical adhesive.

Fans 375 may be positioned within the housing 400 to force the external air through the inlet 200 and outlet 210. Fans 375 could be positioned anywhere within the housing 400, but are preferably near either the inlet 200 or outlet 210. Fans 375 may be placed near both the inlet 200 and outlet 210 or only near one of the two. Section line 2-2 is shown cutting vertically through the assembly 401.

Figure 2:
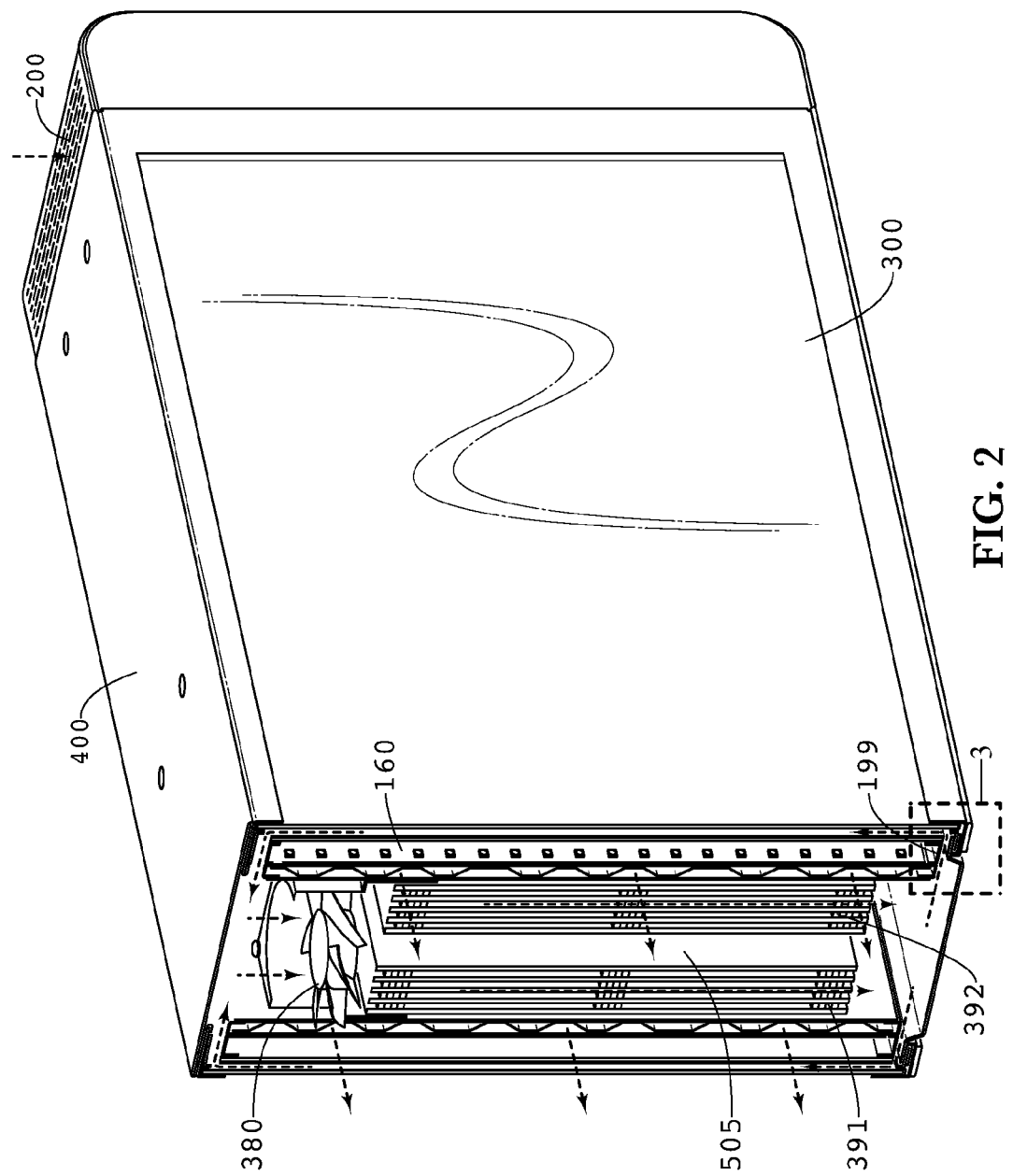
FIG. 2 is a perspective section view of the car top assembly taken from section line 2-2 and showing the location for detail 3.

FIG. 2 is a perspective section view of the car top assembly taken from section line 2-2 and showing the location for detail 3. In an exemplary embodiment, the assembly is substantially symmetrical about a vertical center plane, so the assembly will be described mostly with reference to a first side, as the second side is substantially the same. Both the first and second sides preferably contain an embodiment of the rigid LCD assembly 199. The assembly preferably contains two paths for cooling air. The first path (open loop) is external air which is drawn through the inlet 200 and preferably forced through a first heat exchanger 392, second heat exchanger 391, behind a first backlight 160, and behind a second backlight (for the opposing LCD). The open loop is forced by the fans 375 described above.

The second path (closed loop) is used to force circulating air through a first heat exchanger 392, second heat exchanger 391, between the protective plate 300 and a first LCD, and between a second protective plate and a second LCD. The circulating gas is preferably forced through the closed loop path by fan 380, which could be placed anywhere in the path of the closed loop, but here is shown above the first and second heat exchangers 392 and 391. The second path (closed loop) can be thought of as a single figure-8 type flow or a combination of loops. The first loop can be described as beginning at the fan 380, travelling through the heat exchanger 392, continuing between the rigid LCD assembly 199 and the transparent protective plate 300, and finally returning to the fan 380. The second loop would also begin at the fan 380, but would instead travel through the heat exchanger 391, continuing between the opposing LCD assembly and the opposing transparent protective plate, and finally returning to the fan 380.

Preferably, the circulating air traveling through the closed loop is not permitted to mix with the external air travelling through the open loop. This prevents dust, water vapor, pollen, and other contaminates from entering sensitive portions of the display, specifically the gap 505 between the two heat exchangers as well as the gap between the rigid LCD assembly 199 and the transparent protective plate 300. The gap 505 is preferably used to house the electronics for powering and driving the rigid LCD assemblies.

Figure 3:
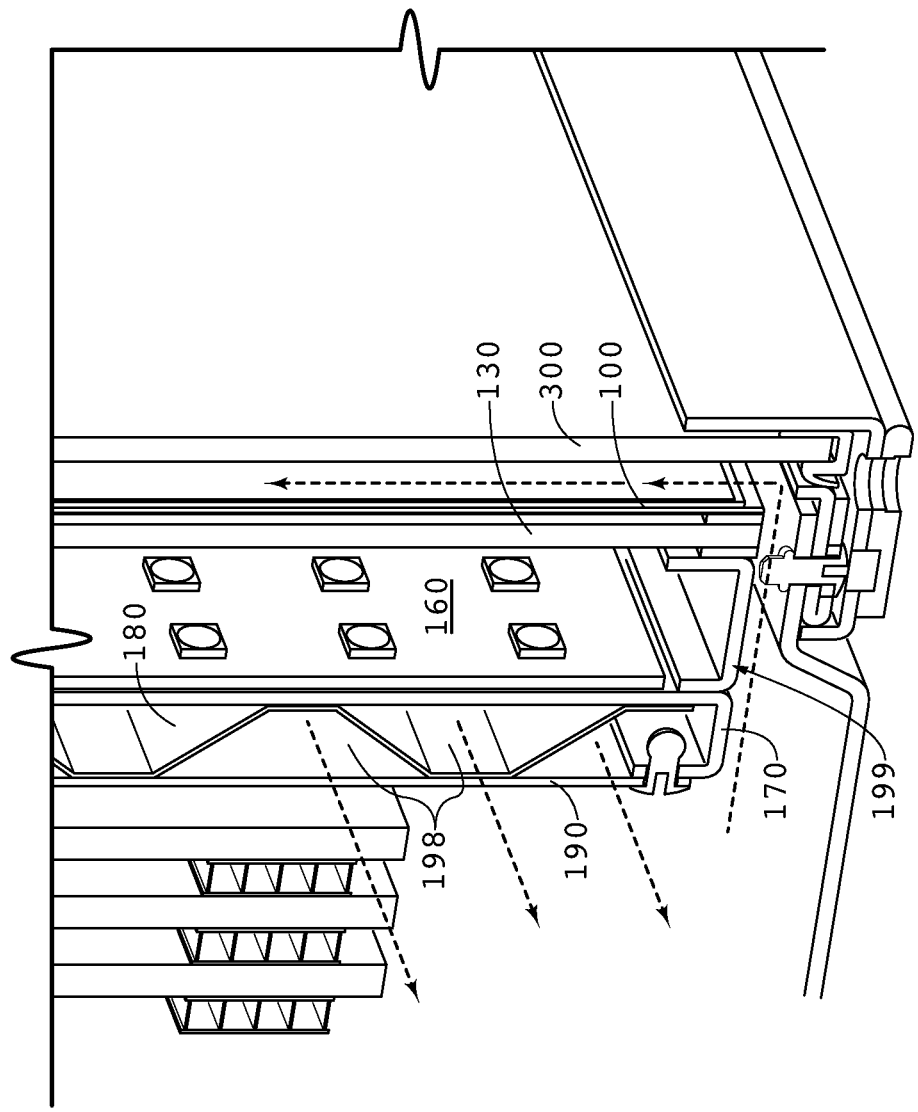
FIG. 3 is a perspective section view of detail 3.

FIG. 3 is a perspective section view of detail 3. The rigid LCD assembly 199 preferably contains an LCD 100 as the outermost layer. A gap is preferably defined between the LCD 100 and the plate 300, which accepts the closed loop circulating gas. The backlight 160 is positioned behind the diffuser 130 and is preferably in conductive thermal communication with a front thermal plate 170. A corrugated layer 180 is preferably sandwiched between the front thermal plate 170 and a rear thermal plate 190. Preferably, the corrugated layer 180 is in conductive thermal communication with the front thermal plate 170 and rear thermal plate 190. In an exemplary embodiment, the front thermal plate 170, rear thermal plate 190, and corrugated layer 180 are all comprised of metal and even more preferably of aluminum or stainless steel. Also in an exemplary embodiment, the corrugated layer 180 would contact the front thermal plate 170 and rear thermal plate 190 in an alternating fashion.

A series of channels 198 are preferably defined by the combination of the front thermal plate 170, rear thermal plate 190, and corrugated layer 180. The channels 198 guide the open loop air and allow heat to be removed from the backlight 160 by transferring to the heat to the front thermal plate 170, rear thermal plate 190, and corrugated layer 180. In some embodiments, the corrugate layer 180 may not be used, but the open loop air is simply forced between the front thermal plate 170 and rear thermal plate 190.

Figure 4:
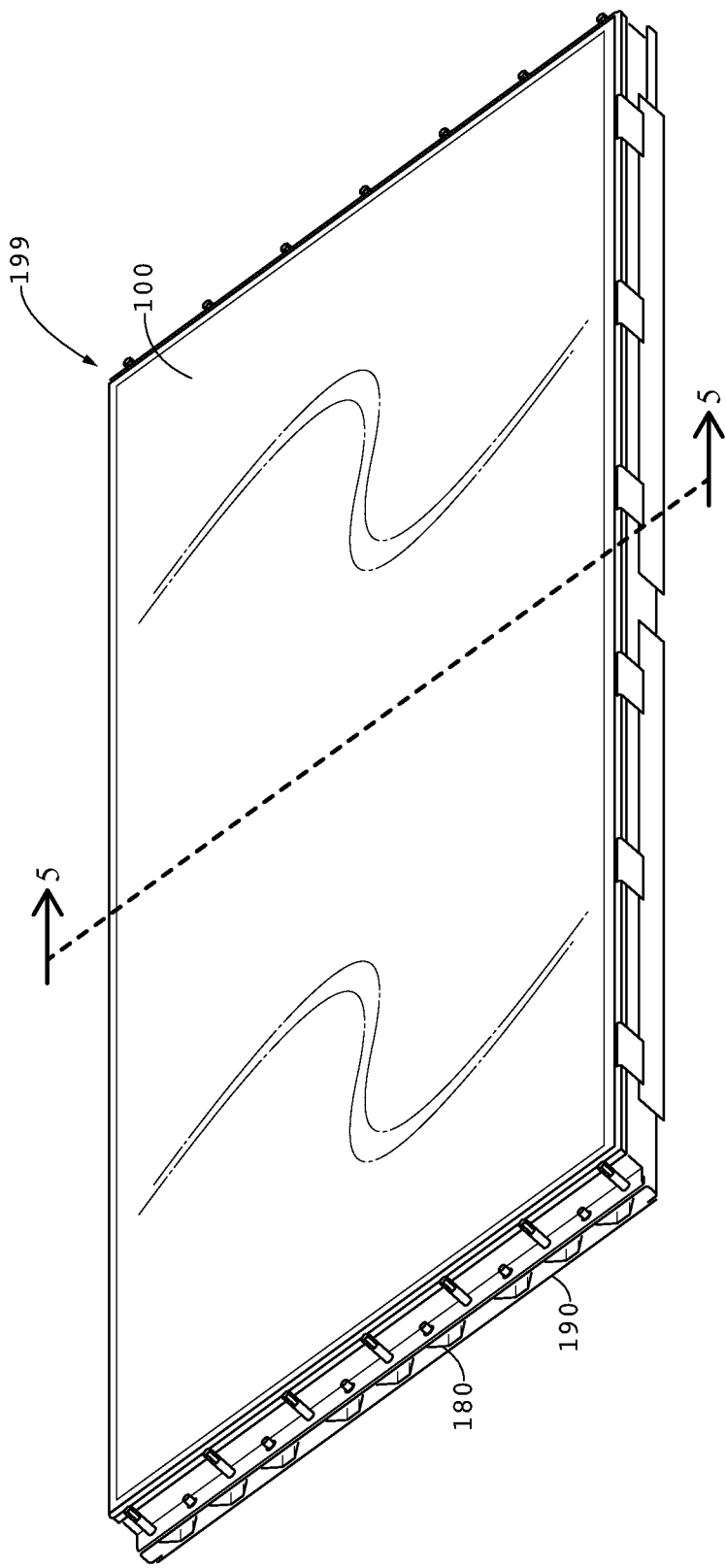
FIG. 4 is a perspective view of an exemplary embodiment for the rigid LCD assembly and showing the section line 5-5.
Figure 5:
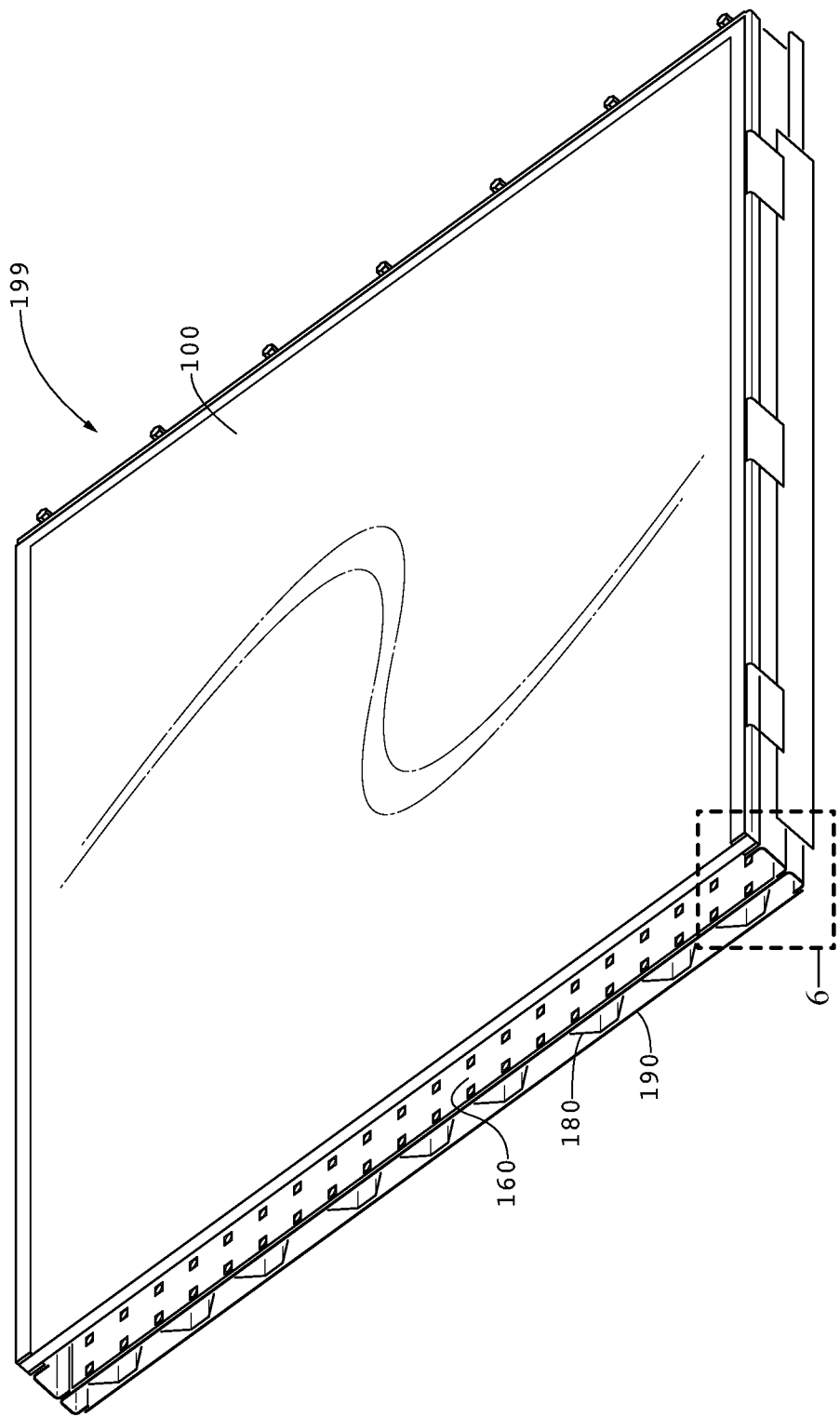
FIG. 5 is a perspective section view taken from section line 5-5 and showing detail 6.

FIG. 4 is a perspective view of an exemplary embodiment for the rigid LCD assembly 199 and showing the section line 5-5. As shown, an exemplary embodiment for the rigid LCD assembly 199 would contain each layer found between the LCD 100 and the rear thermal plate 190. FIG. 5 is a perspective section view taken from section line 5-5 and showing detail 6.

Figure 6:
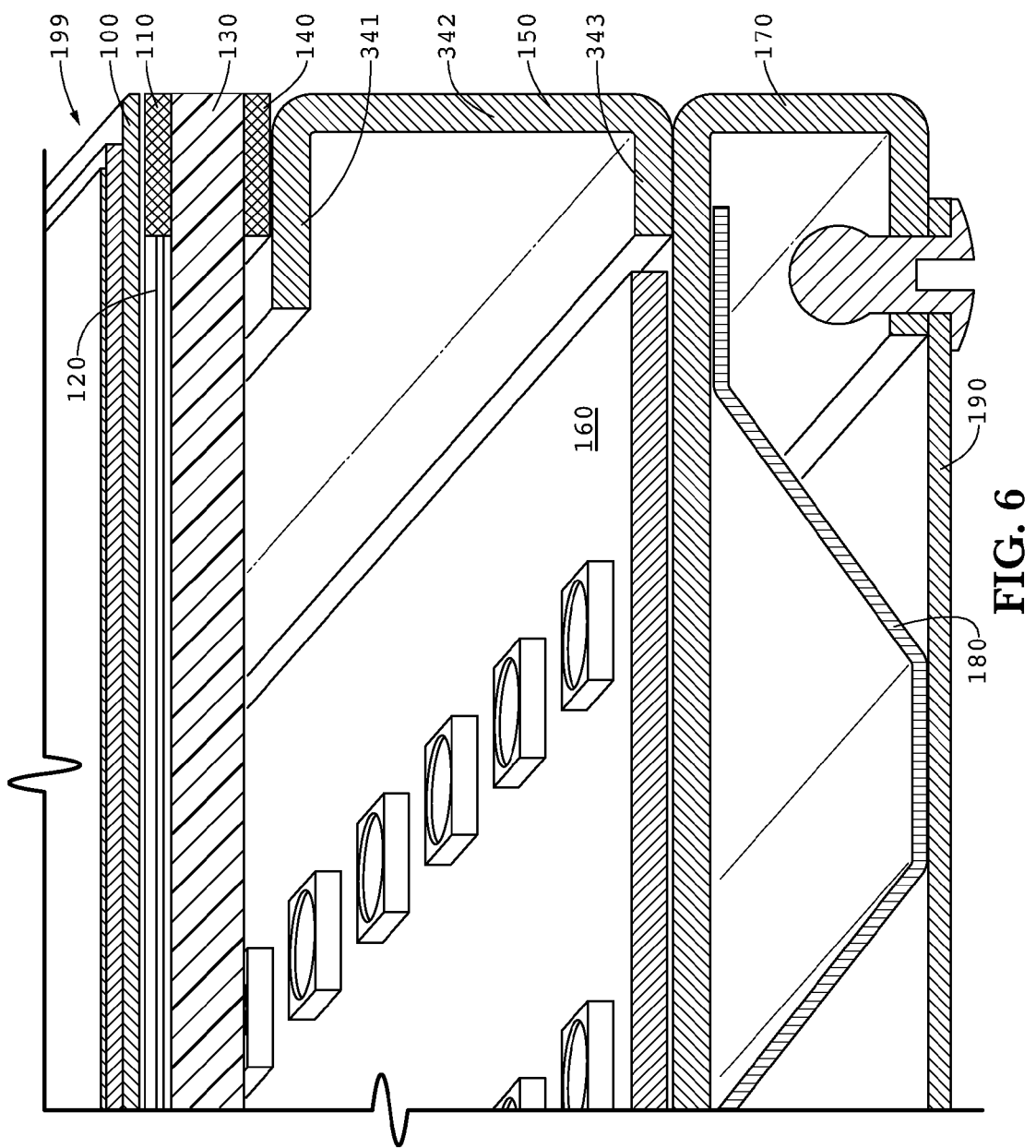
FIG. 6 is a perspective section view of detail 6.

FIG. 6 is a perspective section view of detail 6. A layer of adhesive 110 is preferably used to bond the LCD 100 to a diffuser plate 130, sandwiching one or more optical films 120 in between the LCD 100 and the diffuser plate 130. It is preferable to provide the adhesive 110 in a thickness that is approximately equal to the thickness of the optical films 120 as this would prevent the films from shifting, bunching, or buckling due to thermal or shock issues. It may be preferable to constrain the optical films in a cavity (defined between the LCD 100, diffuser plate 130, and adhesive 110) that is approximately the same thickness as the optical films 120 but has a length and width which is slightly larger than the films, to allow for thermal expansion/contraction without buckling. In other words, it may be preferable to allow the optical films 120 to float within the directions parallel to the films themselves, while constraining the films to prevent movement within directions perpendicular to the optical films 120. The adhesive 110 is generally placed around the perimeter of the diffuser plate 130.

While not required, it is preferable that the diffuser plate 130 is a glass plate, which helps to provide rigidity to the assembly. In an exemplary embodiment, the diffuser plate 130 is a glass plate with a coating or treatment on the front surface which causes the diffusion of the light. In some embodiments the front surface of the glass may have a thin white flashed layer. In a preferred embodiment, the diffuser plate 130 would comprise Opalika® filterglass from Schott North America. The data sheet for Opalika® filterglass can be found at www.us.schott.com/architecture and is herein incorporated by reference in its entirety. It should be noted that while a plate is preferred for the diffuser 130, a traditional diffuser film or plastic plate could also be used in some embodiments.

Another layer of adhesive 140 is preferably used to bond the diffuser plate 130 to the backlight cavity walls 150, which in an exemplary embodiment have a U-shaped cross-section and would be formed sheet metal. The backlight cavity walls 150 are preferably attached to the front thermal plate 170, which is preferably in contact with the backlight 160. The backlight 160 is preferably a metal printed circuit board having a plurality of LEDs. The rear thermal plate 190 may be attached to the front thermal plate 170 so as to interpose the corrugated layer 180 in between. The layer of adhesive 140 is preferably placed around the perimeter of the diffuser 130.

In a preferred embodiment, the backlight cavity walls 150 would have a U-shaped cross-section defined by a top ledge 341 with a top surface, bottom ledge 343 with a bottom surface, and a sidewall 342 connecting the top ledge 341 with the bottom ledge 343. In a preferable arrangement, the top ledge 341 and bottom ledge 343 would be substantially parallel and the sidewall 342 would be substantially perpendicular to the top ledge 341 and bottom ledge 343. Preferably, the top surface of the top ledge 341 would attach to the adhesive 140 while the bottom surface of the bottom ledge 343 would attach to the front thermal plate 170.

The adhesive layers 140 and 110 could be any number of adhesives, but are preferably very high bond (VHB) tape. In this way, the thickness of the VHB tape could be selected to be similar to the thickness of the optical films 120. Although not required, the adhesive layers 140 and 110 would preferably run all around the perimeter of the assembly 199 so as to completely seal each of the layers and prevent dust and contaminates to enter the assembly and disrupt any resulting images or damage the components.

Figure 7:
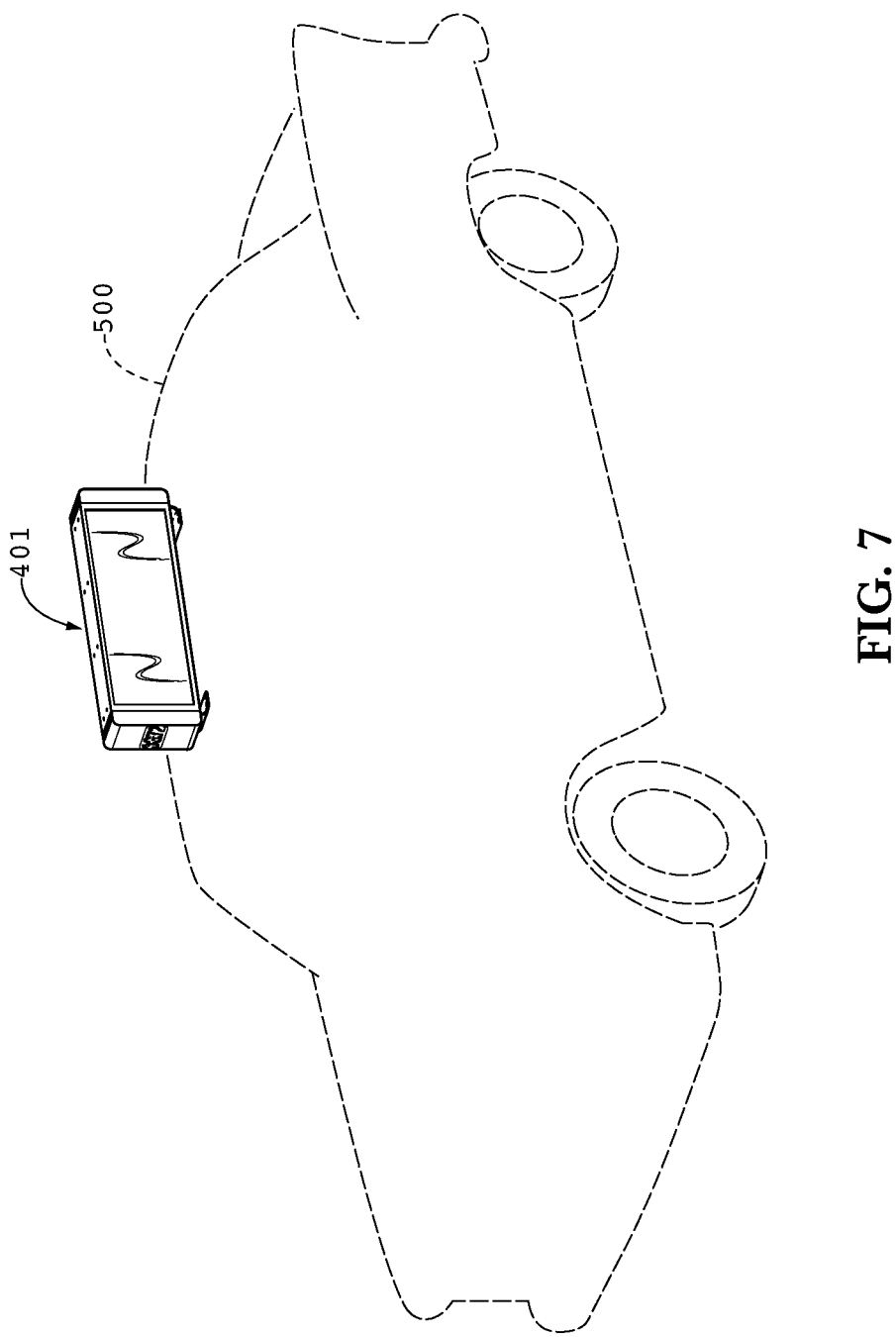
FIG. 7 is a perspective illustration of the car top LCD assembly of FIG. 1 shown mounted atop an automobile.

FIG. 7 is a perspective illustration of the car top LCD assembly 401 of FIG. 1 shown mounted atop an automobile 500.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A rigid LCD assembly comprising:
a liquid crystal display (LCD) having a perimeter;
a first layer of tape attached around the perimeter of the LCD;
a diffusing plate attached to the layer of tape so as to create a cavity defined by the space between the LCD, tape, and diffusing plate; and
an optical film positioned within the cavity.

2. The LCD assembly of claim 1 wherein:
the tape has a thickness which is substantially equal to the thickness of the optical film.

3. The LCD assembly of claim 1 wherein:
the diffusing plate is comprised of glass.

4. The LCD assembly of claim 1 further comprising:
a second layer of tape attached around a perimeter of the diffusing plate and positioned on the opposite side of the diffusing plate as the first layer of tape;
backlight cavity walls attached to the second layer of tape to define a backlight cavity; and
a backlight placed within the backlight cavity.

5. The LCD assembly of claim 4 wherein:
the backlight cavity walls have a U-shaped cross section.

6. The LCD assembly of claim 4 wherein:
the backlight cavity walls comprise
a top ledge which attaches to the second layer of tape,
a bottom ledge substantially parallel to the top ledge, and
a sidewall which connects the top ledge with the bottom ledge.

7. The LCD assembly of claim 4 further comprising:
a front thermal plate attached to the backlight cavity walls where the backlight is attached to the front thermal plate.

8. The LCD assembly of claim 7 further comprising:
a fan positioned to force external air along the front thermal plate.

9. The LCD assembly of claim 6 further comprising:
a rear thermal plate positioned opposite to the front thermal plate where the space between the front and rear thermal plates defines a gap; and
a fan positioned to force external air through said gap.

10. The LCD assembly of claim 9 further comprising:
a corrugated layer placed within the gap.

11. The LCD assembly of claim 10 wherein:
the corrugated layer contacts the front thermal plate and rear thermal plate in an alternating fashion throughout the gap.

12. A rigid LCD assembly comprising:
a liquid crystal display (LCD);
a glass diffusing plate having a perimeter where the diffusing plate is attached to the LCD by a first layer of adhesive which travels along the perimeter of the diffusing plate;
a backlight cavity walls positioned against the glass diffusing plate, on a side opposing the LCD, where the backlight cavity walls are attached to the glass diffusing plate by a second layer of adhesive which traverses the perimeter of the glass diffusing plate; and
a backlight placed within the backlight cavity walls.

13. The LCD assembly of claim 12 wherein:
the backlight cavity walls have a U-shaped cross section.

14. The LCD assembly of claim 12 wherein:
the backlight cavity walls comprise
a top ledge which attaches to the diffusing plate with the second layer of adhesive,
a bottom ledge substantially parallel to the top ledge, and
a sidewall which connects the top ledge with the bottom ledge.

15. The LCD assembly of claim 12 further comprising:
a cavity defined between the LCD, glass diffusing plate, and the first layer of adhesive;
a plurality of optical films placed within the cavity.

16. The LCD assembly of claim 15 wherein:
the cavity has a thickness which is substantially equal to a thickness of the plurality of optical films while the cavity has a length and width which is greater than the length and width of the optical films.

17. The LCD assembly of claim 15 wherein:
the optical films are permitted to move within the cavity, in directions parallel to the films.

18. A rigid LCD assembly comprising:
a liquid crystal display (LCD) having a perimeter;
a layer of tape attached around the perimeter of the LCD;
a diffusing plate attached to the layer of tape so as to create a cavity defined by the space between the LCD, tape, and diffusing plate;
an optical film contained within the cavity;
a front thermal plate positioned parallel to the diffusing plate and on the opposite side of the diffusing plate as the LCD;
a U-shaped backlight cavity wall placed between the thermal plate and the diffusing plate and comprising:
a top ledge which attaches to the diffusing plate with a layer of adhesive,
a bottom ledge substantially parallel to the top ledge and attached to the front thermal plate, and
a sidewall which connects the top ledge with the bottom ledge.
a backlight positioned within the backlight cavity wall; and
a rear thermal plate positioned opposite from the front thermal plate to define a gap between the front and rear thermal plates.

19. The LCD assembly of claim 18 wherein:
the optical film is permitted to move within the cavity, in directions parallel to the film but the film is substantially constrained in directions perpendicular to the film.

20. The LCD assembly of claim 18 wherein:
the top ledge and bottom ledge of the backlight cavity wall are substantially parallel while the sidewall is substantially perpendicular to the top ledge and bottom ledge.

* * * * *